Patented Oct. 7, 1924.

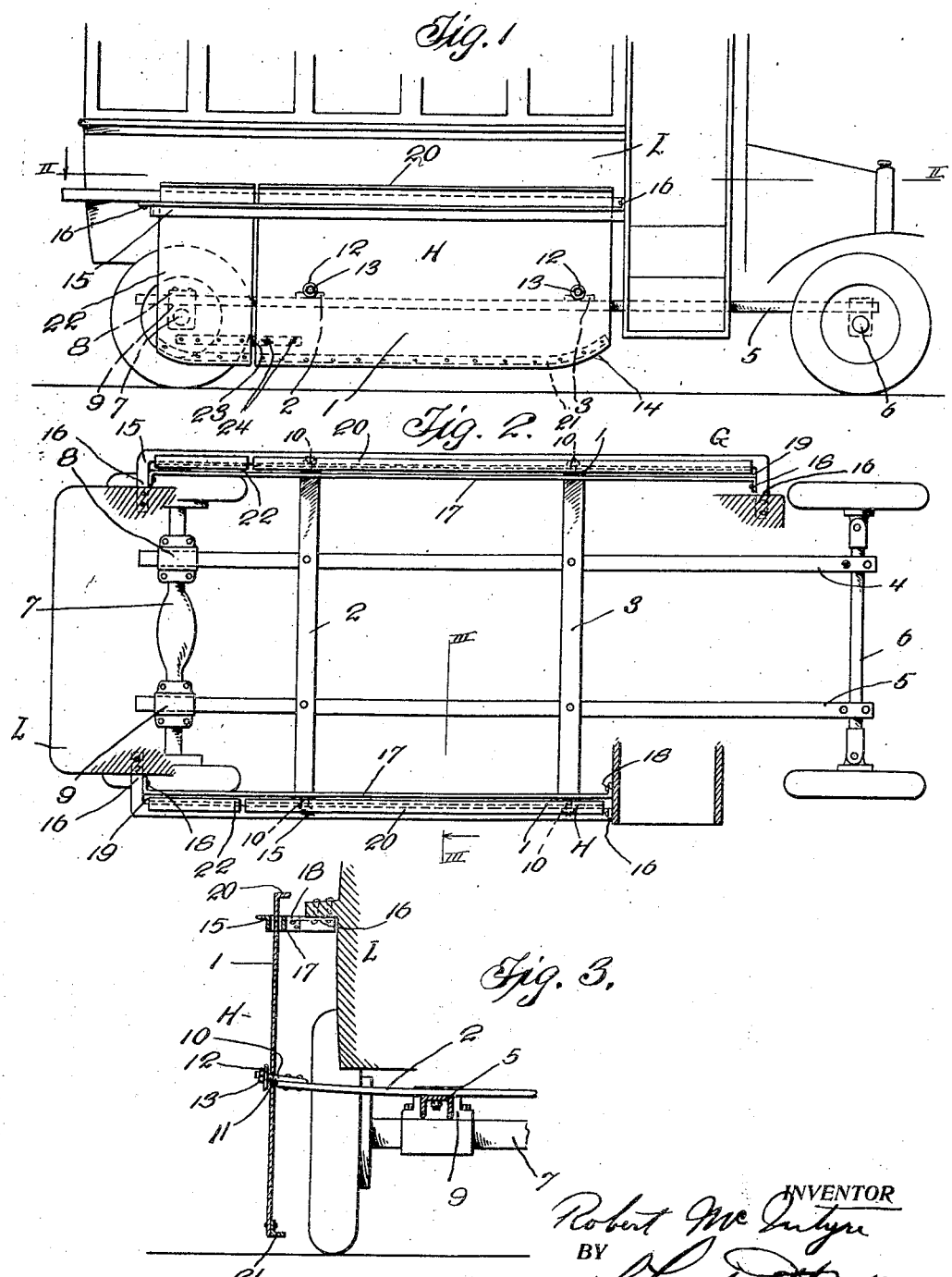

1,511,085

UNITED STATES PATENT OFFICE.

ROBERT McINTYRE, OF NORTH BERGEN, NEW JERSEY.

SAFETY GUARD FOR THE REAR WHEELS OF VEHICLES.

Application filed June 19, 1924. Serial No. 720,887.

*To all whom it may concern:*

Be it known that I, ROBERT MCINTYRE, a citizen of the United States, and resident of North Bergen, in the county of Bergen and State of New Jersey, have invented certain new and useful Improvements in Safety Guards for the Rear Wheels of Vehicles, of which the following is a specification.

This invention relates to a safety guard for the rear wheels of vehicles, and an object of the invention is to provide a guard device which will serve effectually to prevent the likelihood of any person falling under the rear wheels of the vehicle when approaching the vehicle from the side, the invention being particularly useful in the protection of automobile buses and vehicles of this character used in transportation.

A further object is to provide a guard device which may be attached on to the side of the vehicle in a simple and substantial manner and which is supported in a manner to enable it to yield to the swaying movements of the vehicle body relative to the chassis of the vehicle.

More particularly stated, the embodiment of the invention herein shown includes a guard plate arranged in a vertical position at the side of the vehicle and supported partly by the vehicle body and partly by the chassis.

Other objects and aims of the invention, more or less specific than those referred to above, will be in part obvious and in part pointed out in the course of the following description of the elements, combinations, arrangements of parts, and applications of principles constituting the invention, and the protection contemplated will be indicated in the appended claims.

In the accompanying drawings, which are to be taken as a part of this specification, and in which I have shown merely a preferred form of embodiment of the invention:

Fig. 1 is a side elevational view of a guard device constructed in accordance with this invention and shown in position upon the side of a vehicle.

Fig. 2 is a top plan view of the guard device seen in Fig. 1, portions of the vehicle being seen in horizontal section upon the plane of line II—II of Fig. 1, and Fig. 3 is a vertical sectional view taken upon the plane of line III—III of Fig. 2.

Referring to the drawings for describing in detail the structure therein shown, the reference character L indicates the body portion of a suitable vehicle such as an ordinary passenger bus or the like.

The reference character G indicates the guard device at the left hand side of the vehicle, and the reference character H indicates the guard device at the right hand side of the vehicle.

The guard devices G and H comprise plates 1—1 in vertical positions just outside of the vertical planes of the outer surfaces of the vehicle wheels and supported by means of two or more cross-brackets, as 2 and 3, which extend across beneath the body of the vehicle and which are in turn supported by a pair of supporting rods 4 and 5.

The rods 4 and 5 are mounted upon the chassis of the vehicle and preferably are connected with front and rear axles, as 6 and 7. They may have fixed connection with front axle 6, but preferably have a sliding engagement within bearing members 8 and 9 carried by the rear axle 7 so as not to interfere with the usual slight movements of the two axles toward and away from each other.

While the drawing herewith shows the rods 4 and 5 as being fixed to the front axle and slidable on the rear axle, this arrangement may be reversed if desired, that is said rods may be fixed to the rear axle and made slidable in bearings on the front axle.

The cross-brackets 2 and 3 are preferably of spring material. They may be connected with the guard plates 1—1 in any suitable manner, but for the purpose of illustration here they are shown to be fittted with bolt-like extensions 10 at their opposite ends which project through apertures 11 in the guard plates, and which have retaining washers 12 and nuts 13 at the outer surfaces of the guard plates for holding the guard plates in proper assembly while yet leaving sufficient looseness to permit easy spring movement of the cross-brackets and readily accommodate the swaying and twisting of the several parts of the chassis.

It is intended that the cross-brackets 2 and 3 shall directly support the entire weight of the guard plates. The resiliency of the cross-brackets allows a desirable amount of movement of the plates vertically as may be required, for instance, when the lower edges of the plates come into contact with some obstruction on the roadway. In this event the rounded end portions as 14 at said lower edges will usually ride over the obstruction and lift the plate meanwhile bending up the adjacent end portion of one or both of the cross-brackets. When the obstruction has been passed the plate will return again to its normal position, that is with its lower edge some four or five inches, more or less, from the surface of the roadway.

In order to guide the plates, and maintain them against lateral movement, suitable guide brackets are provided adjacent to the upper edges of said plates. The guide brackets as illustrated consist each of a bar 15, preferably of angle iron, extending longitudinally of the plate along the outer surface of the plate, the end portions of said bar being suitably shaped, as at 16, for attachment to convenient portions of the vehicle body, and a second bar as 17 extending parallel to the first and along the inner surface of the plate. The opposite end portions as 18 of the second bar are fixed to parts of the first bar or to convenient parts of the vehicle body, so that said two bars cooperate to provide a slot as 19 between them vertically through which the plates freely move and are guided.

Preferably the upper edge portion of each plate is formed with a flange 20 to serve as a safety device by which to limit the possible downward movement of the plate and to serve as a support for the plate in the event of failure of one or more of the cross-brackets 2 or 3. This flange may be turned either inwardly or outwardly, and in either case it will engage one or the other rods 15 or 17 and thereby prevent detachment of the plate downwardly through the slot 19.

These guide brackets thus constitute auxiliary supports for the guard plates.

A suitable reinforcing member as 21 is fixed to the lower edge of each plate in a position to serve as a runner and guard member whenever said lower edge comes into contact with the road.

While the drawings herewith show the guard plates extending from a point behind the front wheels of the vehicle to a point lapping the rear wheels, it will be understood that said guard plates may, if desired, be made of a length to lap both the front and the rear wheels or the front wheels only, as the case may be.

In order to provide for access to the wheels which are lapped by the plates, as for instance the rear wheels seen in the drawings, the portions as 22 of the guard plates which stand in position lapping said wheels are formed separate from the main parts of the plates and are connected to said main parts by suitable means enabling the lapping portions to be readily detached which is desirable at certain times as for instance when tires are to be changed or other repairs are to be made to the wheels, etc.

In the instance illustrated, the detachable sections or parts 22 are provided with extension bars 23 arranged to lap the main parts of the plates and to be connected thereto by suitable bolts and thumb-nuts or the like as 24 the removal of which will permit easy removal of the detachable sections.

A vehicle equipped with guard plates in the general position as herein indicated will be improved in appearance and will be safe against the likelihood of any person being injured by falling under the rear wheels of the vehicle. The rear wheels of heavy vehicles are so far removed from possible observation by the driver and are so ponderous and obtrusive that they are frequently the cause of serious accident to pedestrians. It not infrequently happens that persons are run over or otherwise injured by these wheels without even any knowledge of the accident reaching the driver at the time. Such accidents will be quite impossible where the guard device of this invention is present.

As many changes could be made in this construction without departing from the scope of the invention as defined in the following claims, it is intended that all matter contained in the above description or shown in the accompanying drawings should be interpreted as illustrative only, and not in a limiting sense.

Having thus described the invention, what I claim as new and desire to secure by Letters Patent is:—

1. A safety guard for vehicles comprising a guard plate arranged at one side of the vehicle, and resilient means to support said guard plate from the chassis of the vehicle.

2. A safety guard for vehicles comprising a guard plate arranged in vertical position at one side of the vehicle, a resilient support for said plate by which the plate is capable of vertical movement relative to the vehicle body, and guide means to guide said plate.

3. A safety guard for vehicles comprising a guard plate arranged in vertical position at one side of the vehicle, a resilient support for said plate by which the plate is capable of vertical movement relative to the vehicle body, and a guide for said plate carried by the vehicle body.

4. A safety guard for vehicles comprising a guard plate arranged in a vertical position at one side of the vehicle, a resilient support for said plate by which the plate is capable of vertical movement relative to the vehicle body, a guide for said plate carried by the vehicle body, and said guide and said plate comprising parts cooperative to prevent accidental detachment of the plate upon failure of the resilient support.

5. A safety guard for vehicles comprising a pair of guard plates arranged one at each side of the vehicle, a supporting means extending longitudinally of the vehicle, being connected with the vehicle axles, and cross brackets carried by said supporting means extending transversely beneath the vehicle and supporting by their opposite ends said guard plates.

6. A safety guard for vehicles comprising a pair of guard plates arranged one at each side of the vehicle, a plurality of cross brackets extending transversely of the vehicle and connected with the chassis of the vehicle, said cross brackets being of resilient material and being connected by their opposite ends with said guard plates to resiliently support said guard plates.

7. A safety guard for the side of a vehicle which has its body portion spring-supported upon a suitable chassis, said guard comprising a guard-plate arranged at one side of the vehicle disposed in a substantially vertical position beyond the outer side surface of one of the vehicle wheels, means whereby said guard plate is supported from the vehicle chassis and thereby movable relative to the vehicle body, and guide means carried by the body slidably receiving said plate to guide the movements of said plate.

8. A safety guard for the side of a vehicle which has its body portion spring-supported upon a suitable chassis, said guard comprising a guard-plate arranged at one side of the vehicle disposed in a substantially vertical position beyond the outer side surface of one of the vehicle wheels, spring means whereby said guard plate is supported from the vehicle chassis and thereby movable relative to the vehicle body, and guide means carried by the body slidably receiving said plate to guide the movements of said plate.

9. A safety guard for vehicles comprising a pair of guard plates arranged one at each side of the vehicle, a supporting means extending longitudinally of the vehicle being connected to and supported by the vehicle chassis, and spring brackets carried by said supporting means extending transversely beneath the vehicle body and being connected by their opposite ends to said guard plates to resiliently support said guardplates.

10. A safety guard for the side of a vehicle which has its body portions spring-supported upon a suitable chassis, said guard comprising a guard-plate arranged at one side of the vehicle disposed in a substantially vertical position in a plane beyond the outer side surface of one of the vehicle wheels, said plate extending along the side of the vehicle and having a portion of its length overlapping one of the vehicle wheels, means whereby said plate is supported from the vehicle chassis and thereby movable relative to the vehicle body, guide means carried by the body engaging the plate to guide the movements of the plate relative to the body, and means whereby the mentioned portion of the plate overlapping one of the vehicle wheels may be readily moved out of its overlapping position to thereby gives access to said wheel.

In testimony whereof I affix my signature in the presence of two witnesses.

ROBERT McINTYRE.

Witnesses:
L. GESSFORD HANDY,
GEORGE B. McINTYRE.